(No Model.) 2 Sheets—Sheet 1.
C. F. T. STEINWAY.
PIANO PEDAL.
No. 314,741. Patented Mar. 31, 1885.
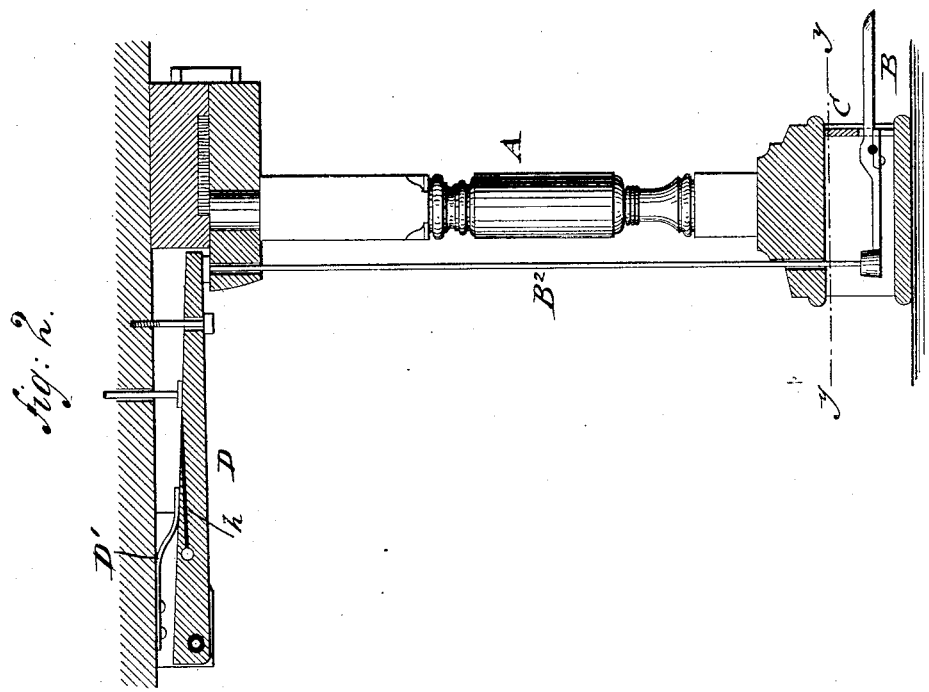
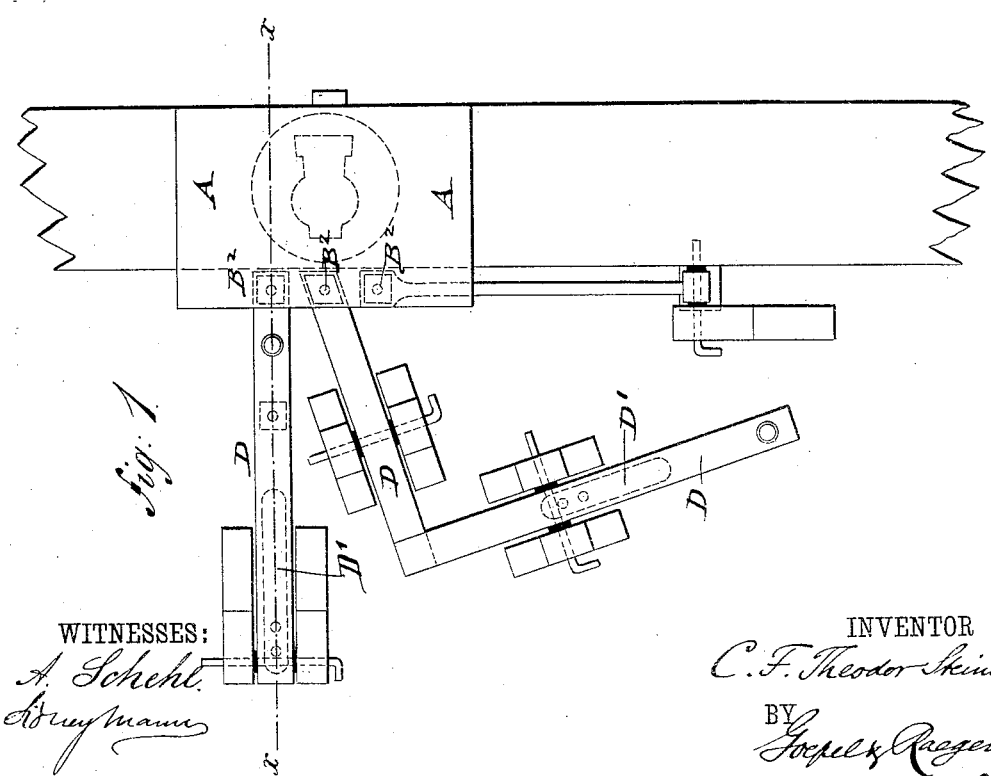
WITNESSES:
A. Schehl.
[signature]
INVENTOR
C. F. Theodor Steinway
BY Goepel & Raegener
ATTORNEYS.

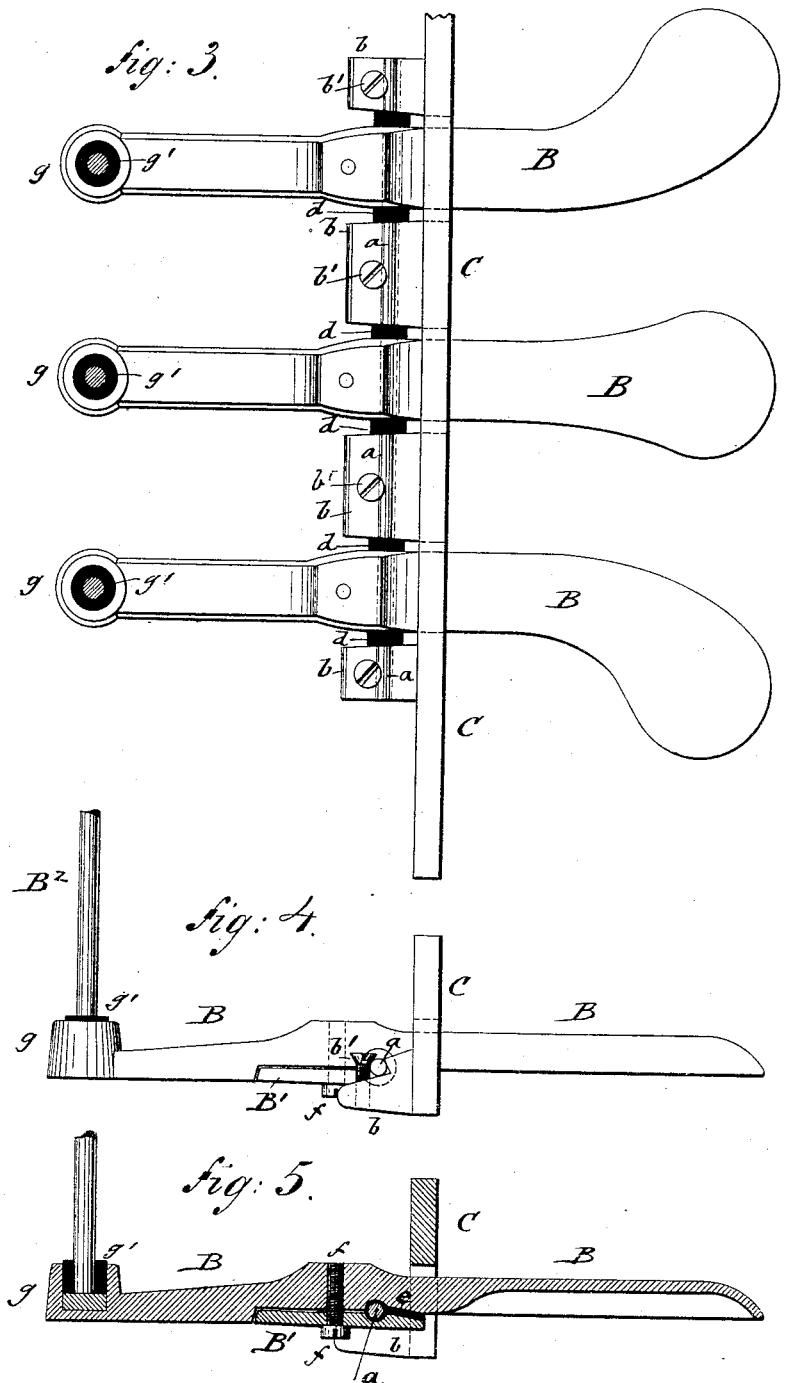

UNITED STATES PATENT OFFICE.

C. F. THEODOR STEINWAY, OF NEW YORK, N. Y.

PIANO-PEDAL.

SPECIFICATION forming part of Letters Patent No. 314,741, dated March 31, 1885.

Application filed March 26, 1884. (No model.)

*To all whom it may concern:*

Be it known that I, C. F. THEODOR STEINWAY, of the city, county, and State of New York, have invented certain new and useful Improvements in Pedals for Piano-Fortes, of which the following is a specification.

This invention has reference to an improved pedal for piano-fortes of all kinds, whereby the creaking noise produced at the pivots of the pedals and at the connection of the pedals with the pedal-rods and pedal-levers, and at all points of the pedals where friction of the parts takes place, is entirely prevented; and the invention consists of a pedal-supporting plate having rear brackets and clamp-screws for supporting the fixed pivot-rod of the pedals. The pedals are recessed at the under side and fulcrumed to the fixed pivot-rod by means of detachable cheeks and anti-friction bushings. Anti-friction washers are interposed between the pedals and the supporting-brackets on the pivot-rod. The rear end of the pedals is formed in the shape of a socket having an elastic lining for the pedal-rods. The pedal-levers are provided at the point where the returning-spring bears on them with a slitted portion that is lined with felt, whereby a creaking noise at that point is prevented.

In the accompanying drawings, Figure 1 represents a bottom view of a square or other piano, showing the lyre and connecting pedal-levers. Fig. 2 is a vertical longitudinal section on line x x, Fig. 1. Fig. 3 is a detail horizontal section of the pedals on line y y, Fig. 2; and Figs. 4 and 5 are respectively a side view of one of the pedals and a vertical longitudinal section of the same.

Similar letters of reference indicate corresponding parts.

Referring to the drawings, A represents the lyre, or that part of the piano to the base of which the pedals B are applied. The pedals B are fulcrumed to a fixed transverse pivot-shaft, $a$, of a vertical cast-metal supporting-plate, C, which is recessed for the pedals, and provided at its rear side with recessed brackets $b\ b$, that form the support for the fixed pivot-shaft $a$. The pivot-shaft $a$ is retained rigidly in position on the brackets $b\ b$ by set-screws $b'$, which clamp the pivot-shaft $a$ against the recesses of the brackets $b\ b$, as shown clearly in Fig. 4. The pedals B are provided at their under side with a recess for a detachable plate or cheek, B', which, like the shank of the pedals, is provided with a semicircular recess that fits around the pivot-shaft $a$.

To prevent the friction between the pivot-shaft $a$ and the pedal and its retaining-cheek B', a bushing, $e$, of flannel or other suitable material, is wrapped around the pivot-shaft $a$, and extended forward between the under side of the pedal B and the cheek B', as shown clearly in Fig. 5.

Intermediately between the brackets $b$ and the fulcrumed pedals B are placed on the pivot-shaft $a$ intermediate leather washers, $d$, which prevent any friction between the sides of the pedals and the supporting-brackets. The cheek B' is secured to the shank of the pedal B by a clamp-screw, $f$. On detaching the clamp-screws and cheeks B' the bushing $e$ may be replaced from time to time, in case it should be worn out. In this manner any creaking or other noise at the fulcrum of the pedals at the point, where it most frequently occurs, is entirely done away with, and thereby a frequent source of annoyance obviated.

The pedal-supporting plate E is either supported at the base of the lyre, as in the case of grand or square pianos, or in upright pianos it is let into the case at the base of the same. As the plate C is screwed either to the lyre or to the case, as the case may be, it can be easily detached therefrom, so that any worn-out parts can be replaced. The rear ends of the pedals B are made in the shape of sockets $g$, which are lined at the bottom and side with suitable elastic material, said lining $g'$ forming an interior elastic socket for the connecting pedal-rods B². The lower ends of the pedal-rods B B² rest thereby not only upon elastic anti-friction material, but are surrounded by the same, so that the motion of the rods in the sockets is perfectly noiseless. The pedal-rods B² are guided in a suitable manner by the lyre and press at their upper ends on the pedal-levers D, which operate by connecting-rods the dampers in the usual manner. The pivoted pedal-levers D are returned, together with the pedal-rods B² and pedals B, into normal position by strong band-springs D'. The band-springs cause, frequently, by the pressure and friction with the pedal-levers D, an annoying creaking noise. To prevent this the pedal-levers D are obliquely slitted, the slit being provided with an interposed bushing, *h*, of suitable noise-deafening material, as shown in Fig. 2. The ends of the band-springs D' press thereby upon a cushioned surface of wood, which "gives" sufficiently to prevent any creaking noise.

In place of the slitting of the pedal-levers the surface of the same may be covered with a layer of veneer that is cushioned by a layer of suitable noise-deafening material.

An anti-friction pedal constructed as described has no parts that can produce noise by friction, and forms thereby a desirable accessory to the different kinds of pianos. It has the further advantage that the pedals can be quickly removed bodily by unscrewing the supporting-plate without lifting or otherwise interfering with the piano.

Having thus described my invention, I claim as new and desire to secure by Letters Patent—

1. The combination of a pedal-supporting plate having a fixed pivot-shaft with pedals fulcrumed thereto by bushings and detachable bottom plates or cheeks, substantially as set forth.

2. The combination of a pedal-supporting plate having rear brackets and clamp-screws, a fixed transverse pivot-shaft, pedals fulcrumed thereto by detachable bottom cheeks, and intermediate anti-friction bushings, substantially as set forth.

3. The combination of the pedal-supporting plate C, having recesses for the pedals, recessed rear brackets, *b b*, provided with clamp-screws, a transverse pivot-shaft, *a*, secured rigidly by said clamp-screws, and fulcrumed pedals B, having detachable bottom plates, B', secured by screws *f*, the pivot-recesses of the pedals and bottom plates being lined with a suitable anti-friction material, substantially as set forth.

4. The combination of the recessed pedal-supporting plate C, having rear brackets, *b b*, pivot-shaft secured to said brackets by clamp-screws *b'*, pedals B, having detachable bottom cheeks, B', said pedals being connected to the pivot-shaft by means of anti-friction bushings and intermediate anti-friction washers placed intermediately between the pedals and the brackets, substantially as and for the purpose set forth.

5. In pedals for piano-fortes, the combination of the pedal-levers provided with cushioned strips of wood with returning band-springs which rest upon said cushioned strips, substantially as specified.

In testimony that I claim the foregoing as my invention I have signed my name in presence of two subscribing witnesses.

C. F. THEODOR STEINWAY.

Witnesses:
LOUIS C. RAEGENER,
SIDNEY MANN.